US007831824B2

(12) United States Patent
Abdulhayoglu

(10) Patent No.: US 7,831,824 B2
(45) Date of Patent: Nov. 9, 2010

(54) HALLMARKING VERIFICATION PROCESS AND SYSTEM AND CORRESPONDING METHOD OF AND SYSTEM FOR COMMUNICATION

(76) Inventor: Melih Abdulhayoglu, 10 Hey Street, Bradford, West Yorkshire (GB) BD7 1DQ ( * ) Notice: Subject to any disclaimer, the term of this patent is extended or adjusted under 35 U.S.C. 154(b) by 1063 days.

(21) Appl. No.: 10/239,436

(22) PCT Filed: Mar. 20, 2001

(86) PCT No.: PCT/GB01/01200

§ 371 (c)(1),
(2), (4) Date: Feb. 20, 2003

(87) PCT Pub. No.: WO01/71460

PCT Pub. Date: Sep. 27, 2001

(65) Prior Publication Data
US 2004/0078564 A1    Apr. 22, 2004

(30) Foreign Application Priority Data

| Mar. 20, 2000 | (GB) | ................................. | 0006606.8 |
| Jun. 9, 2000 | (GB) | ................................. | 0014462.6 |
| Sep. 8, 2000 | (GB) | ................................. | 0022289.3 |

(51) Int. Cl.
*H04L 9/00* (2006.01)
(52) U.S. Cl. ................ 713/156; 713/155; 713/158; 713/170; 713/176; 713/193; 726/30; 705/76; 715/200; 715/202; 715/205; 715/273; 715/738
(58) Field of Classification Search ................ 713/156, 713/201, 155, 175, 176, 168, 193; 705/51, 705/64, 44, 76; 726/4, 26, 1, 2, 3, 5; 715/738, 715/204, 517, 781
See application file for complete search history.

(56) References Cited

U.S. PATENT DOCUMENTS

| 5,855,020 | A | * | 12/1998 | Kirsch | .......................... | 707/10 |
| 5,958,051 | A | * | 9/1999 | Renaud et al. | ................. | 726/22 |
| 6,018,724 | A | * | 1/2000 | Arent | ........................... | 705/44 |
| 6,018,801 | A | * | 1/2000 | Palage et al. | .................... | 726/2 |
| 6,131,162 | A | * | 10/2000 | Yoshiura et al. | ............. | 713/176 |
| 6,161,145 | A | * | 12/2000 | Bainbridge et al. | ......... | 709/246 |
| 6,233,341 | B1 | * | 5/2001 | Riggins | ...................... | 380/277 |
| 6,301,658 | B1 | * | 10/2001 | Koehler | ....................... | 713/155 |
| 6,310,956 | B1 | * | 10/2001 | Morito et al. | ................ | 380/201 |

(Continued)

FOREIGN PATENT DOCUMENTS

EP    0 982 927 A    3/2000

OTHER PUBLICATIONS

Shinsuke Honjo et al, "Internet-Marks: The Secure Seal for WWW Site Authentication", pp. 393-398, IEEE 2000.*

(Continued)

*Primary Examiner*—Nasser Moazzami
*Assistant Examiner*—Shanto M Abedin

(57) ABSTRACT

The present invention discloses a hallmark verification process for verifying a hallmark of a web site, the process comprising the step of a user activating a hallmark verification process on a device with access to the web site in which the web site does not have access to the activation of the verification request.

10 Claims, 9 Drawing Sheets

U.S. PATENT DOCUMENTS

| | | | |
|---|---|---|---|
| 6,321,339 B1 * | 11/2001 | French et al. | 726/2 |
| 6,367,012 B1 * | 4/2002 | Atkinson et al. | 713/176 |
| 6,367,013 B1 * | 4/2002 | Bisbee et al. | 713/178 |
| 6,421,781 B1 * | 7/2002 | Fox et al. | 726/4 |
| 6,442,689 B1 * | 8/2002 | Kocher | 713/158 |
| 6,618,709 B1 * | 9/2003 | Sneeringer | 705/412 |
| 6,622,247 B1 * | 9/2003 | Isaak | 713/155 |
| 6,671,805 B1 * | 12/2003 | Brown et al. | 713/176 |
| 6,775,771 B1 * | 8/2004 | Shrader et al. | 713/167 |
| 6,812,938 B2 * | 11/2004 | Pinnell | 715/741 |
| 6,941,476 B2 * | 9/2005 | Harrison et al. | 726/5 |
| 7,069,443 B2 * | 6/2006 | Berringer et al. | 713/180 |
| 7,114,177 B2 * | 9/2006 | Rosenberg et al. | 726/4 |
| 7,203,838 B1 * | 4/2007 | Glazer et al. | 713/176 |
| 2001/0033297 A1 * | 10/2001 | Shastri et al. | 345/741 |

OTHER PUBLICATIONS

Godwin J Udo et al, Effective Commercial Web site Design: An Empirical Study, pp. 313-318, IEEE 2000.*

Paul de Graaff et al, Global Certificate Usage with OS/390 Webservers, Draft Document for Review, pp. 1-62, IBM, Feb. 1999.*

* cited by examiner

HALLMARKING VERIFICATION PROCESS AND SYSTEM AND CORRESPONDING METHOD OF AND SYSTEM FOR COMMUNICATION

This application is a national stage application, according to Chapter II of the Patent Cooperation Treaty. This application claims the priority filing date of Mar. 20, 2000 for United Kingdom Patent Application No. 0006606.8.

FIELD OF THE INVENTION

The present invention relates to digital hallmarking verification processes and systems and to corresponding methods of and systems for communication.

BACKGROUND TO THE INVENTION

When an internet user accesses an internet site (often referred to as a web site) it is often difficult to determine how confident the user should be of the bona fides of the site and site provider. It is known, therefore, for third parties to offer a digital hallmarking service.

A digital hallmark service operates as follows. A web site provider will have their site verified or authenticated, for instance for the security of their commercial transactions if a user purchases items or services from them over the internet, and once verified the verification centre gives the provider a verification number. A user, when accessing the site, will see a pictorial representation of a verification, often in the form of an illustration of a seal, which if they click upon it will link them to a page with details of the verification and the unique verification number.

Although at first sight this may seem a useful system, it is very easily open to abuse. A nefarious site provider can simply copy the link image (typically a seal) and a verification page from a respectable verification provider or competitor site and the user accessing the site is none the wiser. There is no independent verification at this stage.

It is, therefore, a significant problem that current verification systems do not in reality offer security or confidence to users.

It is an aim of the preferred embodiments of the invention to obviate or overcome disadvantages encountered in relation to the prior art.

SUMMARY OF THE INVENTION

According to the present invention in a first aspect, there is provided a hallmark verification process for verifying a hallmark of a web site, the process comprising the step of a user activating a hallmark verification process on a device with access to the web site in which the web site does not have access to the activation of the verification request.

The activation step can be the activation of an independent (i.e. independent of the web site) application for hallmark verification and/or of the activation of an operation within such an application. Activation within an application may be automatic.

This process allows verification to be accomplished without a potentially nefarious web site operator being able to interfere in the process. Typically the activation is of an executable program external to the digital content of the web site.

Suitably, the web site comprises a digital certificate. Suitably, the digital certificate comprises data for displaying the hallmark. Suitably, the hallmark verification process comprises displaying in a window only verified hallmarks. Suitably, the hallmark verification process comprises determining the location of a verified hallmark and distinctively displaying the verified hallmark. Suitably, the hallmark verification process comprises the steps of verifying the digital certificates, displaying a hallmark from the digital certificate at a location and indicating the veracity of a certificate at the location to the user.

Suitably, as part of the verification process data (typically random data) is sent from the user to a remote hallmark verification source periodically. This can prevent web site providers from intercepting a message from the user to the remote hallmark verification source and responding themselves on its behalf. The web site provider will not know to which set of data communicating with the remote hallmark verification source they should respond.

Suitably, the hallmark verification process comprises the steps of:

(i) a user requesting a digital hallmark verification of a hallmark verification source and data being provided to the hallmark verification source data to identify the web site and/or service to be verified;
(ii) the hallmark verification source providing the user and the web site and/or service provider with an index signal and a corresponding verification signal;
(iii) the user providing the index signal to the web site and/or service provider;
(iv) the web site and/or service provider providing the user with the verification signal corresponding to the index signal; and
(v) the user comparing the verification signal provided by the provider with the verification signal provided by the hallmark verification source to verify the web site and/or service if the verification signals correspond.

In this specification, unless the context requires otherwise, the hallmark verification source may be based locally or remotely.

Typically, the executable program comprises a hyperlink to a web site of the hallmark verification source.

Suitably, the hallmark verification process comprises the steps of:
(i) identifying at least one hallmark to verify on the web site;
(ii) comparing data from the hallmark on the web site with verification data; and
(iii) providing a signal to the user indicating the results of the comparison of step (ii) above.

Suitably, identification of the hallmark is by pattern recognition of a hallmark device.

According, to the present invention in a second aspect there is provided a hallmark verification process for verifying a hallmark of a web site, the process comprising the steps of:
(i) identifying at least one hallmark to verify on the web site;
(ii) comparing data from the hallmark on the web site with verification data; and
(iii) providing a signal to the user indicating the results of the comparison of step (ii) above.

Suitably, identification of the hallmark is by pattern recognition of a hallmark device.

Suitably, the step (ii) comprises the sub-step of:

obtaining verification data comprising attributes of the hallmark and comparing the verification data attributes with the attributes of the hallmark of the web site.

Suitably, a corresponding digital certificate is provided for the at least one hallmark to be verified and the step (ii) comprises the sub-steps of:

(ii) (a) obtaining verification data attributes from the digital certificate; and
(ii) (b) comparing the verification data attributes with attributes of the hallmark of the web site.

Suitably, the attributes of the hallmark comprises one or more of:
the URL of the web site authorises to display the hallmark;
file name;
file format;
file size;
file dimensions;
a hash of one or more of the above characteristics;
expiry date; and/or
location of revocation data.

Suitably, the at least one hallmark to be verified comprises a tag identifying it as such. Suitably, the tag comprises a predetermined sequence, typically an alphanumeric sequence. Suitably, the step (ii) comprises the sub-steps of:
(ii)(c) identifying the Uniform Resource Locator ("URL") of the browser in focus;
(ii)(d) obtaining for the identified URL attributes of the at least one hallmark valid for the identified URL;
(ii)(e) comparing the obtained attributes with the attributes of the hallmark of the web site.

Suitably, the signal provided to the user is a visual signal. Suitably, the visual signal comprises the step of blanking out the content of the web site in focus, except for the verified hallmark. Suitably, the visual signal comprises the step of the user moving a pointer (typically the mouse pointer) over a hallmark to be verified which hallmark only remains in place if it is verified. Suitably, the visual signal comprises altering the appearance of a verified hallmark. Suitably the altered appearance includes the step of flashing the verified hallmark. Suitably, the verified hallmark is flashed in colours and/or shapes that change and correspond to colours and/or shapes displayed elsewhere to the user.

Suitably, the hallmark verification process comprises the steps of:
(i) identifying the URL of the web site in focus;
(ii) obtaining identification data for at least one hallmark valid for the web site; and
(iii) providing to the user an identifier for a verified hallmark.

According to the present invention in a third aspect, there is provided a hallmark verification process for verifying a hallmark of a web site, the process comprising the steps of:
(i) identifying the URL of the web site in focus;
(ii) obtaining identification data for at least one hallmark valid for the web site; and
(iii) providing to the user an indication of a verified hallmark.

Suitably, identification of the hallmark is by pattern recognition of a hallmark device.

Suitably, the identification data is obtained from a hallmark verification source separate from the user's machine.

Suitably, the identification data comprises a visual representation of the verified hallmark. Suitably, the identification data comprises a signal (typically a number or alphanumeric) identifying the verified hallmark form a hallmark database. Typically, the hallmark database is on the user's machine.

Suitably, the indication provided to the user comprises a visual display of the verified hallmark. The user can therefore compare the displayed verified hallmark(s) with those on the web site to see which of these displayed by the web site are verified. The displayed hallmark is displayed in a window separate from that of the web site.

Suitably, the user, web-site and remote hallmark verification source are in communication with each other via the internet.

Suitably, the hallmark verification process comprises the steps of:
(i) maintaining a database of verified hallmarks;
(ii) periodically reading a web site having a URL;
(iii) determining the verified hallmarks of the web site;
(iv) updating the database according to the result of step (iii); and
(v) upon a request by a user communicating to the user the verified hallmark or hallmarks of a particular URL by comparing the user request with the database of verified hallmarks.

Suitably, the web sites read are those prior registered with the database.

According to the present invention in a fourth aspect, there is provided a hallmark verification process for verifying a hallmark of a web site, the process comprising the steps of:
(i) maintaining a database of verified hallmarks;
(ii) periodically reading a web site having a URL;
(iii) determining the verified hallmarks of the web site;
(iv) updating the database according to the result of step (iii); and
(v) upon a request by a user communicating to the user the verified hallmark or hallmarks of a particular URL by comparing the user request with the database of verified hallmarks.

Suitably, the step (iii) comprises the sub-steps of:
(iii) (a) comparing at least one attribute of the hallmark of the web site with the corresponding attribute of the corresponding hallmark in the database; and
(iii) (b) verifying the hallmark of the web site if the attributes match.

Alternatively, a corresponding digital certificate is provided for the hallmark to be verified and the step (iii) comprises the sub-steps of:
(iii) (c) obtaining verification data from the digital certificate; and
(iii) (d) comparing the verification data attributes with attributes of the hallmark of the web site.

Suitably, the attributes compared can be one or more of:
the URL of the web site authorises to display the hallmark;
file name;
file format;
file size;
file dimensions;
a hash of one or more of the above characteristics;
expiry date; and/or
location of revocation data.

Suitably, the periodic readings are irregular in time. Suitably, multiple readings may be taken in a second.

Suitably, a potentially verifiable hallmark is identified by a visual signature. Suitably, identification of the hallmark is by pattern recognition of a hallmark device.

Suitably, the database maintains, for each URL read, a record of which hallmarks are verified and which are not. Suitably, hallmark verification (or otherwise) is communicated visually to the user. Suitably, a first colour is displayed to indicate that all hallmarks of the site are verified, a second colour is displayed to indicate unauthorised hallmarks. Suitably, a third colour is displayed while hallmark verification is underway.

Suitably, the database is maintained on a device separate from the user's machine, which device can be connected to the user's machine via the internet.

If there are a plurality of web sites open, the web site in focus is the last web site in focus.

According to the present invention in a fifth aspect, there is provided a hallmarking verification process comprising the steps of:
(i) requesting a digital hallmark verification of a hallmark verification source and providing to the hallmark verification source data to identify the web site and/or service to be verified;
(ii) the hallmark verification source providing the user and the web site and/or service provider with an index signal and a corresponding verification signal;
(iii) providing the index signal to the web site and/or service provider;
(iv) the web site and/or service provider providing the verification signal corresponding to the index signal; and
(v) comparing the verification signal provided by the provider with the verification signal provided by the hallmark verification source to verify the web site and/or service if the verification signals correspond.

According to the fifth aspect of the present invention a third party, in this specification referred to as the hallmark verification source, is involved in verifying a web site each time a user seeks verification authenticity. The hallmark verification source can take the data of the web site and/or service to be verified, check it against its records to ensure it is verified by the hallmark verification centre and, if so, provide both sites with a validation signal, typically a random number. Since both the user and the web site (or provider) receive the verification data independently they can have confidence in it and rely upon the outcome. The index signal (typically a number) is provided to identify the user's specific validation request.

The index signal need not be separate from the verification signal and may be provided in a separate format e.g. it may be related to a check sum calculation of the verification signal, its manner of encryption or a decryption key.

Suitably, the user requests a digital hallmark verification on a device with access to the web site whereby the web site does not have access to the activation of the verification request.

Suitably, the user requests a digital hallmark verification by activating an executable program external to the digital content of the web site to be verified (or which contains the service to be verified). This enhances the security of the process because otherwise a nefarious web site provider could, if it has knowledge of the user's access to the verification, provide a fake verification or interfere with the verification process in some other way. By taking the request for verification away from the control of the provider to be verified, security is enhanced.

Typically, the executable program comprises a hyperlink to a web site of the hallmark verification source.

Suitably, the user, web-site and hallmark verification source are in communication with each other via the internet.

Suitably, the executable program provides to the hallmark verification source details of the web site/service to be verified. In effect, therefore, from the user's point of view the system is substantially automated in that upon clicking on the verification link (in a WINDOWS (trade mark) operating system this may be a desk top icon), the web site/service information is provided to the hallmark verification source which provides to both the user and the provider the relevant data for verification which the user can then compare.

This is designed to be a digital hallmark verification process advantageously for use over the internet. Typically this will use computers to communicate between user, remote hallmark verification source and merchant. However any internet capable communication device can be used.

According to the present invention in a sixth aspect, there is provided a hallmark verification system for verifying a hallmark of a web site, the system comprising a user device, a merchant device and a hallmark verification device, the user device being configured to activate a hallmark verification process with access to the web site in which the web site does not have access to the activation of the verification request.

The activation step can be the activation of an independent (i.e. independent of the web site) application for hallmark verification and/or of the activation of an operation within such an application. Activation within an application may be automatic.

Suitably, the web site comprises a digital certificate. Suitably, the digital certificate comprises data for displaying the hallmark. Suitably, the hallmark verification process comprises displaying in a window only verified hallmarks. Suitably, the hallmark verification process comprises determining the location of a verified hallmark and distinctively displaying the verified hallmark. Suitably, the hallmark verification process comprises the steps of verifying the digital certificates, displaying a hallmark from the digital certificate at a location and indicating the veracity of a certificate at the location to the user.

Suitably, as part of the verification system data (typically random data) is sent from the user to a hallmark verification source periodically.

Suitably, the system is configured whereby:
(i) a user requests a digital hallmark verification of a hallmark verification source and data is provided to the hallmark verification source to identify the web site and/or service to be verified;
(ii) the hallmark verification source provides the user and the web site and/or service provider with an index signal and a corresponding verification signal;
(iii) the user provides the index signal to the web site and/or service provider;
(iv) the web site and/or service provider provides the user with the verification signal corresponding to the index signal; and
(v) the user compares the verification signal provided by the provider with the verification signal provided by the hallmark verification source to verify the web site and/or service if the verification signals correspond.

Suitably, identification of the hallmark is by pattern recognition of a hallmark device.

Suitably, the user requests a digital hallmark verification on a device with access to the web site whereby the web site does not have access to the activation of the verification request.

Suitably, the system is configured whereby the user requests a digital hallmark verification by activating an executable program external to the digital content of the web site to be verified (or which contains the service to be verified)

Typically, the executable program comprises a hyperlink to a web site of the hallmark verification centre.

Suitably, the user, web-site and hallmark verification source are in communication with each other via the internet.

Suitably, the executable program provides to the hallmark verification source details of the web site/service to be verified.

Suitably, the system is configured whereby:
(i) at least one hallmark to verify is identified on the web site;
(ii) data from the hallmark on the web site is compared with verification data; and
(iii) a signal to the user is provided indicating the results of the comparison of step (ii) above.

Accordingly, to the present invention in a seventh aspect there is provided a hallmark verification system for verifying a hallmark of a web site, the system being configured whereby:
(i) at least one hallmark to verify is identified on the web site;
(ii) data from the hallmark on the web site is compared with verification data; and
(iii) a signal to the user is provided indicating the results of the comparison of step (ii) above.

Suitably, identification of the hallmark is by pattern recognition of a hallmark device.

Suitably, the feature (ii) comprises the sub-feature of: verification data being obtained comprising attributes of the hallmark and the verification data attributes being compared with the attributes of the hallmark of the web site.

Suitably, a corresponding digital certificate is provided for the at least one hallmark to be verified and the feature (ii) comprises the sub-features of:
(ii) (a) verification data attributes from the digital certificate being obtained; and
(ii) (b) the verification data attributes being compared with attributes of the hallmark of the web site.

Suitably, the attributes of the hallmark comprises one or more of:
the URL of the web site authorises to display the hallmark;
file name;
file format;
file size;
file dimensions;
a hash of one or more of the above characteristics;
expiry date; and/or
location of revocation data.

Suitably, the at least one hallmark to be verified comprises a tag identifying it as such. Suitably, the tag comprises a predetermined sequence, typically an alphanumeric sequence.

Suitably, the feature (ii) comprises the sub-features of:
(ii) (c) the Uniform Resource Locator ("URL") of the browser in focus being identified;
(ii) (d) for the identified URL obtaining attributes of the at least one hallmark valid for the identified URL;
(ii) (e) the obtained attributes being compared with the attributes of the hallmark of the web site.

Suitably, the signal provided to the user is a visual signal. Suitably, the visual signal is provided by blanking out the content of the web site in focus, except for the verified hallmark. Suitably, the visual signal is provided by the user moving a pointer (typically the mouse pointer) over a hallmark to be verified, which hallmark only remains in place if it is verified. Suitably, the visual signal is provided by altering the appearance of a verified hallmark. Suitably the appearance is altered by flashing the verified hallmark. Suitably, the verified hallmark is flashed in colours and/or shapes that change and correspond to colours and/or shapes displayed elsewhere to the user.

Suitably, the hallmark verification system comprises:
(i) the URL of the web site in focus being identified;
(ii) identification data for at least one hallmark valid for the web site being obtained; and
(iii) the user being provided with an identifier for a verified hallmark.

According to the present invention in an eighth aspect, there is provided a hallmark verification system for verifying a hallmark of a web site, the system comprising:
(i) the URL of the web site in focus being identified;
(ii) identification data for at least one hallmark valid for the web site being obtained; and
(iii) the user being provided with an identifier for a verified hallmark.

Suitably, identification of the hallmark is by pattern recognition of a hallmark device.

Suitably, the identification data is obtained from a hallmark verification source separate from the user's machine.

Suitably, the identification data comprises a visual representation of the verified hallmark. Suitably, the identification data comprises a signal (typically a number or alphanumeric) identifying the verified hallmark form a hallmark database. Typically, the hallmark database is on the user's machine.

Suitably, the identifier provided to the user comprises a visual display of the verified hallmark. The user can therefore compare the displayed verified hallmark(s) with those on the web site to see which of these displayed by the web site are verified. The displayed hallmark is displayed in a window separate from that of the web site.

Suitably, the user, web-site and remote hallmark verification source are in communication with each other via the internet.

Suitably, the hallmark verification system is configured whereby:
(i) a database of verified hallmarks is maintained;
(ii) periodically reading a web site having a URL;
(iii) the verified hallmarks of the web site being determined;
(iv) the database being updated according to the result of step (iii); and
(v) upon a request by a user communicating to the user the verified hallmark or hallmarks of a particular URL by comparing the user request with the database of verified hallmarks.

Suitably, the web sites read are those prior registered with the database.

According to the present invention in a ninth aspect, there is provided a hallmark verification system for verifying a hallmark of a web site, the process being configured whereby:
(i) a database of verified hallmarks is maintained;
(ii) periodically reading a web site having a URL;
(iii) the verified hallmarks of the web site being determined;
(iv) the database being updated according to the result of step (iii); and
(v) upon a request by a user communicating to the user the verified hallmark or hallmarks of a particular URL by comparing the user request with the database of verified hallmarks.

Suitably, the feature (iii) comprises the sub-features of:
(iii) (a) at least one attribute of the hallmark of the web site being compared with the corresponding attribute of the corresponding hallmark in the database; and
(iii) (b) the hallmark of the web site being verified if the attributes match.

Alternatively, a corresponding digital certificate is provided for the hallmark to be verified and the step (iii) comprises the sub-features of:
(iii) (c) verification data being obtained from the digital certificate; and
(iii) (d) the verification data attributes being compared with attributes of the hallmark of the web site.

Suitably, the attributes compared can be one or more of:
the URL of the web site authorises to display the hallmark;
file name;
file format;
file size;
file dimensions;
a hash of one or more of the above characteristics;
expiry date; and/or
location of revocation data.

Suitably, the periodic readings are irregular in time. Suitably, multiple readings may be taken in a second.

Suitably, a potentially verifiable hallmark is identified by a visual signature. Suitably, identification of the hallmark is by pattern recognition of a hallmark device.

Suitably, the database maintains, for each URL read, a record of which hallmarks are verified and which are not.

Suitably, hallmark verification (or otherwise) is communicated visually to the user. Suitably, a first colour is displayed to indicate that all hallmarks of the site are verified, a second colour is displayed to indicate unauthorised hallmarks. Suitably, a third colour is displayed while hallmark verification is underway.

Suitably, the database is maintained on a device separate from the user's machine, which device can be connected to the user's machine via the internet.

Suitably, the executable program provides to the hallmark verification source details of the web site/service to be verified.

According to the present invention in a tenth aspect, there is provided a digital hallmarking verification system configured whereby:
(i) upon a digital hallmark verification of a hallmark verification source being requested by a user the hallmark verification source being provided with data to identify the web site and/or service to be verified;
(ii) the hallmark verification source providing the user and the web site and/or service provider with an index signal and a corresponding verification signal;
(iii) the index signal being provided to the web site and/or service provider;
(iv) the web site and/or service provider providing the verification signal corresponding to the index signal; and
(v) comparing the verification signal provided by the provider with the verification signal provided by the hallmark verification source to verify the web site and/or service if the verification signals correspond.

Suitably, the user requests a digital hallmark verification on a device with access to the web site whereby the web site does not have access to the activation of the verification request.

Suitably, the user requests a digital hallmark verification by activating an executable program external to the digital content of the web site to be verified (or which contains the service to be verified). This enhances the security of the process because otherwise a nefarious web site provider could, if it has knowledge of the user's access to the verification, provide a fake verification or interfere with the verification process in some other way. By taking the request for verification away from the control of the provider to be verified, security is enhanced.

Suitably, the executable program provides to the hallmark verification source details of the web site/service to be verified. In effect, therefore, from the user's point of view the system is substantially automated in that upon clicking on the verification link (in a WINDOWS (trade mark) operating system this may be a desk top icon), the web site/service information is provided to the hallmark verification source which provides to both the user and the provider the relevant data for verification which the user can then compare.

According to the present invention in an eleventh aspect, there is provided a method of communication comprising a hallmark verification process according to any one or more of the first to fifth aspect of the present invention.

According to the present invention in a twelfth aspect, there is provided a communication system comprising a hallmark verification system according to any one or more of the sixth to tenth aspects of the present invention.

According to the present invention in a thirteenth aspect, there is provided a digital certificate comprising attributes of a hallmark.

Suitably, the certificate comprises data for displaying a hallmark. Typically this will be a gif file.

Suitably, the certificate comprises an identifier of the web site, typically a URL.

BRIEF DESCRIPTION OF THE FIGURES

The present invention will now be described by way of example only, with reference to the Figures that follow; in which.

DESCRIPTION OF THE PREFERRED EMBODIMENTS

Figure 1:
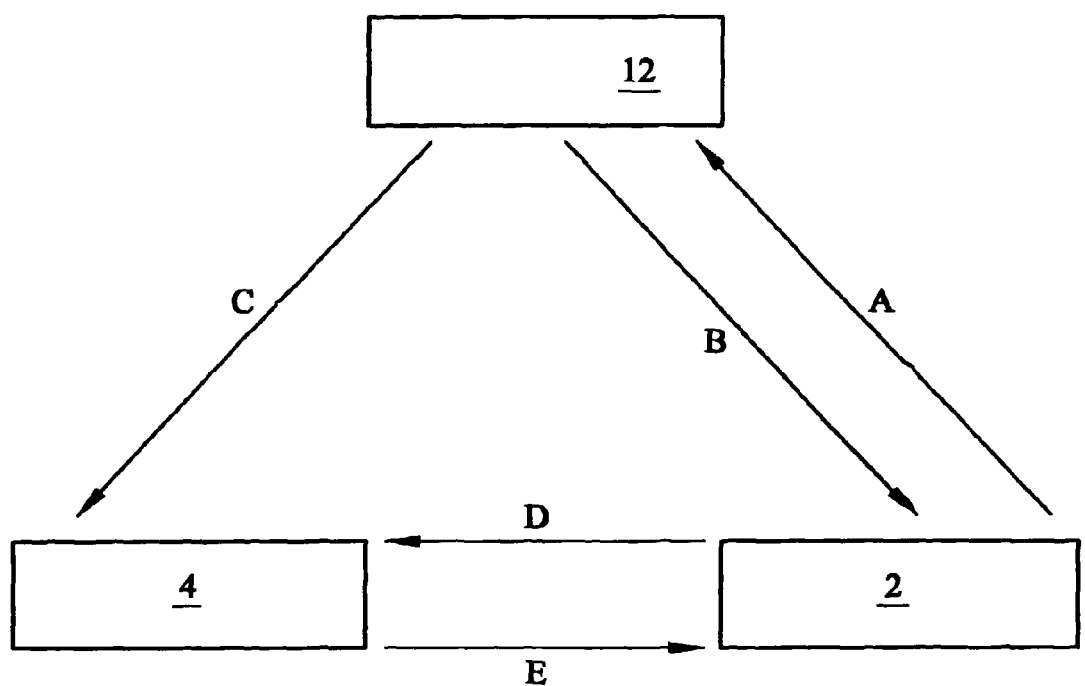
FIG. 1 is a schematic illustration of the operation of the present invention.
Figure 2:
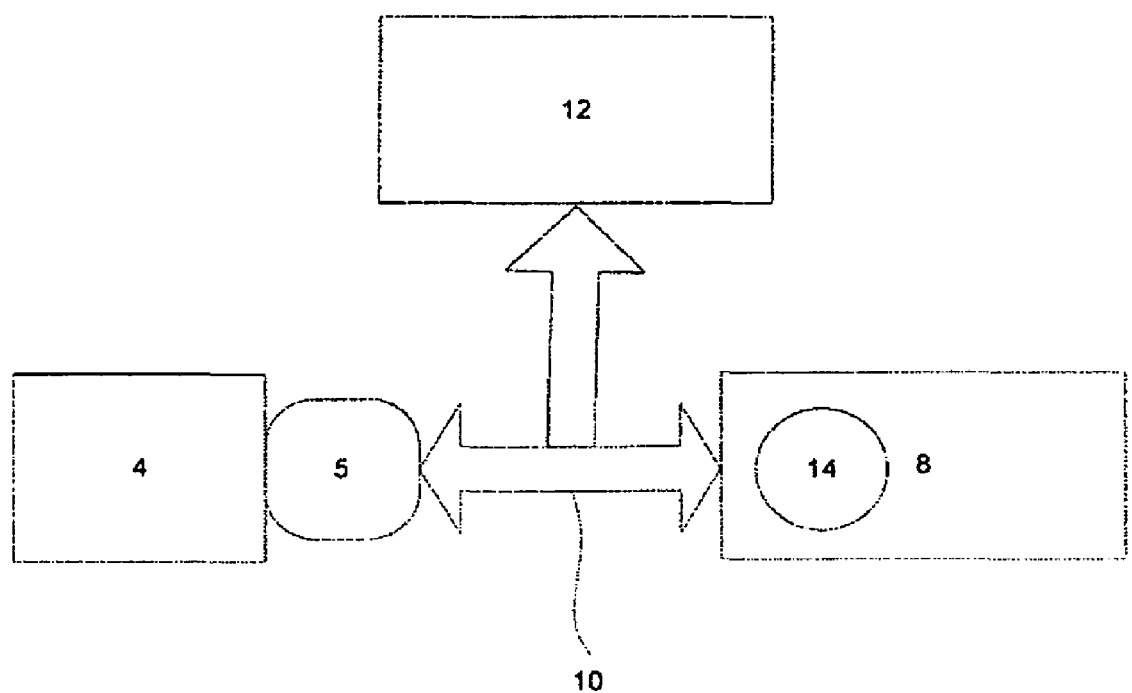
FIG. 2 is a schematic illustration of a system according to the present invention.

Referring to FIGS. 1 and 2 of the drawings that follow, a digital hallmarking verification process according to the present invention is now described. For the purpose of this description it is assumed that PC computer systems are used with a WINDOWS (Trade Mark) Operating System and MICROSOFT (Trade Mark) applications. It will be appreciated that other systems and applications can be used.

The system essentially requires a user 2 operating from a computer terminal 4 with internet access in communication (typically via the internet) with a third party web site 6, in this case a merchant 8 offering over the internet (indicated schematically in FIG. 2 by numeral 10) a commercial transaction. There is also provided a hallmark verification source ("HVS") 12 which is in electronic communication with both the user 2 and the merchant 8.

Figure 3:
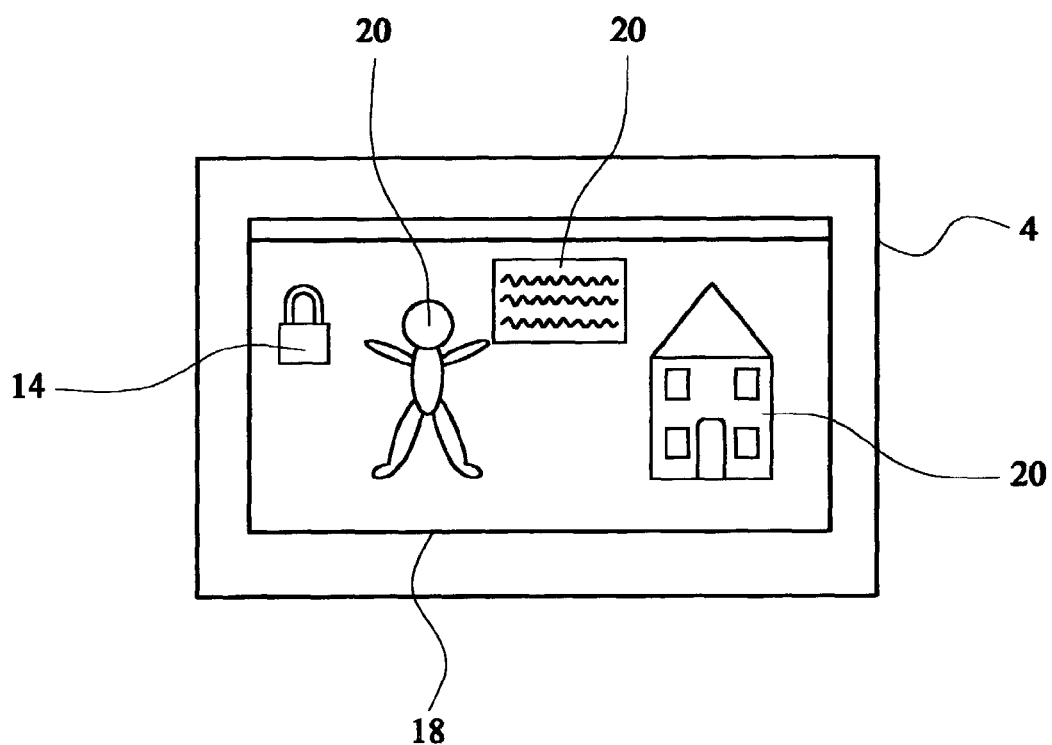
FIG. 3 is a schematic illustration of a web page illustrating part of the present invention.

When the user 2 accesses the merchant's site 6, with reference to FIG. 3 a digital hallmark 14 is displayed on the screen of the user 2 as part of the site, typically in the form of a seal, padlock or other representative device. The web site is displayed as a window 18 with other text and or pictorial elements 20.

The user 2 wishes to verify the digital hallmark 14 on the merchant's site 6. In order to do so, in Step A of FIG. 1 the user 2 activates verification software 5 from the users windows task bar or INTERNET EXPLORER (Trade Mark) tool bar (locations external to the digital content of the website and outside control thereof) the hallmark verification process. It is to be noted that the locations external to the digital content of the web site cannot be forged by the merchant 8 and the merchant 8 will not even known when this verification process is requested. The plug-in software 5 (the verification software) implemented in the process then checks the address (Unique Reference Locator—URL) of the web site in focus and requests confirmation of the hallmark 14 displayed on that particular address by communicating with the HVS 12. The users terminal 4 through the verification software 5 communicates with the HVS 12 via the internet 10 providing the URL of the web site 6.

In step B of FIG. 1, the HVS 12 checks the web site information (URL) provided by user 2 against its records and if the web site is validated, returns to the user 2 data comprising an index number accompanied by a random number and any corresponding information that may be desired relating to the merchant 8 in question, for instance this information may include the level of their e-commerce security, a value of transaction up to which the merchant is accredited etc.

In step C of FIG. 1, occurring at substantially the same time as step B, the index number and random number are sent by HVS 12 to the merchant 8.

In step D of FIG. 1, upon receiving the index number and random number from the HVS 12, the user 2 sends the index number to the merchant 4 which submits a request for the merchant 8 to provide the corresponding random number for this particular index number to the user 2, which occurs at step E of FIG. 1.

Having identified the random number the user 2 wants (via the index number) the merchant 8 sends the random number to the user 2 who then compares the random number received from the HVS 12 with the random number received from the merchant 4. If they correspond then the hallmark has been verified and the site can be deemed authentic. The user 2 is then informed of the authenticity on screen.

In addition as a further security option, the system and process can generate random data packets which are sent periodically (though preferably not on a regular or predictable basis) to the HVS 12 so that anyone intercepting the signals cannot tell which is a verification request. Otherwise it is conceivable that a person seeking to falsely authenticate a site could tell when a verification request is submitted and respond themselves in place of the HVS 12 with the user unaware of the substitution.

It is noted that if multiple hallmarks are displayed on one web site, the verification software 5 displays them all in a new "pop-up" window. The user 2 can then select the hallmark(s) to be verified. The verification process described above takes place for the or each hallmark to be verified.

In an alternative embodiment (or that can be provided as an additional feature of the embodiment described above) instead of the HVS 12 generating the verification signal itself, the verification signal can be generated by the user 2 via the verification software 5. Such a user generated signal can be encrypted for transmission to the HVS 12 and merchant 8. Ideally the user generated verification signal is encrypted separately from transmission to the HVS 12 which decrypts the signal and encrypts it differently to be sent to the merchant 8. This can add additional security of the user 2 because the user generated verification signal can be, known only to the user 2.

Thus, the user can obtain hallmark verification by activating an independent application and activating an action independent of the web site in focus.

Optionally all communication between the user 2, merchant 8 and HVS 12 can be encrypted for extra security.

Figure 4:
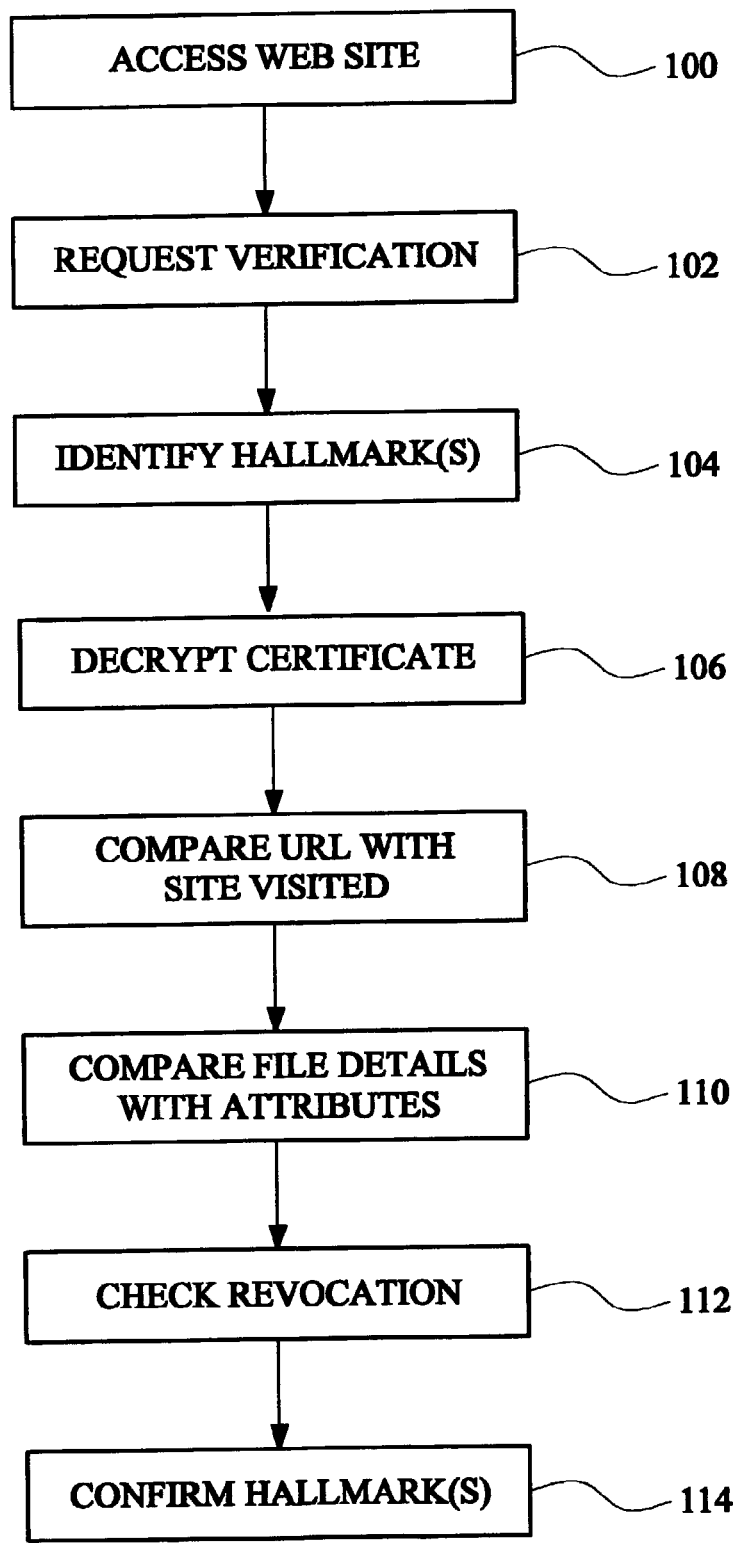
FIG. 4 is a functional flow diagram illustrating a third embodiment of the present invention.

In a third embodiment of the present invention, a verification is obtained without the need for communication with a HVS 12, though in some modifications it can do so. The user, merchant and HVS will be referred to as above, though the verification steps differ in detail. The third embodiment is described in relation to FIG. 4 of the drawings that follow.

In this third embodiment once a user 4 has accessed a web site 8 (step 100) containing at least one hallmark 14, the user 4 requests (step 102) verification of the hallmark(s) by clicking on a system tray icon for the verification software 5 (i.e. where the web site in focus does not have access to the request) referred to here for convenience as E-SIGIL (trade mark). The E-SIGIL plug-in software then reads the URL of browser in focus (or the last in focus f multiple browser windows are open).

Next the E-SIGIL software identifies (step 104) which hallmark(s) 14 the site has. It does so by reading the html code of the web site and identifying a recognition tag for a hallmark. Any hallmark provided for verification by the E-SIGIL software includes such a tag which is a predetermined alphanumeric, in this case E-SIGIL followed by the relevant attributes and a closer symbol eg ">". If a hallmark on the web site does not include the E-SIGIL tag it will not be validated and hence deemed invalid by the software.

In this case, hallmarks for validation by the E-SIGIL software include a recognition tag and a digital certificate. A suitable digital certificate format is that of the X509 digital certificate.

The digital certificate includes the following dedicated information:

a) the URL of the web site authorised to publish the particular hallmark;
b) the file name, file format, file size and file dimensions of the hallmark;
c) the expiry date for the hallmark;
d) optionally, a hash of a) and b) above; and
e) optionally, the location of the Certificate Revocation List or On-Line Certificate Revocation Server (see below).

In addition the X509 digital certificate includes the following information as standard:
i) version
ii) serial number
iii) signature algorithm ID
iv) issuer name
v) validity period
vi) subject name
vii) subject public key information
viii) signature on the above fields The digital certificate contains a secret key encryption (digital certificate) of the data referred to above (using a public key infrastructure). Thus, the user having the public key for decryption of the issuers secret key in the E-SIGIL software can decrypt (step 106) the digital certificate and obtain the data in a)-c) (and optionally d) and e)) above. This verifies the data.

Next the E-SIGIL software uses the decrypted information to verify (or otherwise) the hallmark(s) by:

1) Comparing the URL contained in the certificate (see a) above) with that of the site being visited (step 108).
2) Comparing the file name, file size and file dimensions (see b) above) contained in the certificate with the corresponding attributes of the hallmark presented by the web site (step 110).
3) Checking the revocation date of the hallmark to ensure its validation is still current. This is done by checking the hallmark against a database of hallmarks and corresponding revocation dates in the Certificate Revocation List stored locally or Certificate Revocation Server on a remote machine (step 112).

Only if all three tests are passed does the E-SIGIL software confirm to the user (step 114) that the hallmark is verified (though in other versions other combinations of the tests may be used and even just one alone).

Optionally, the following criteria can also be used to verify the hallmark:

4) A hash of the information a) and b) above can be compared with the decrypted version; and/or
5) Confirm the hallmark revocation status according to the Certificate Revocation List and/or On-Line Revocation Server located, typically, at the HVS.

Figure 5:
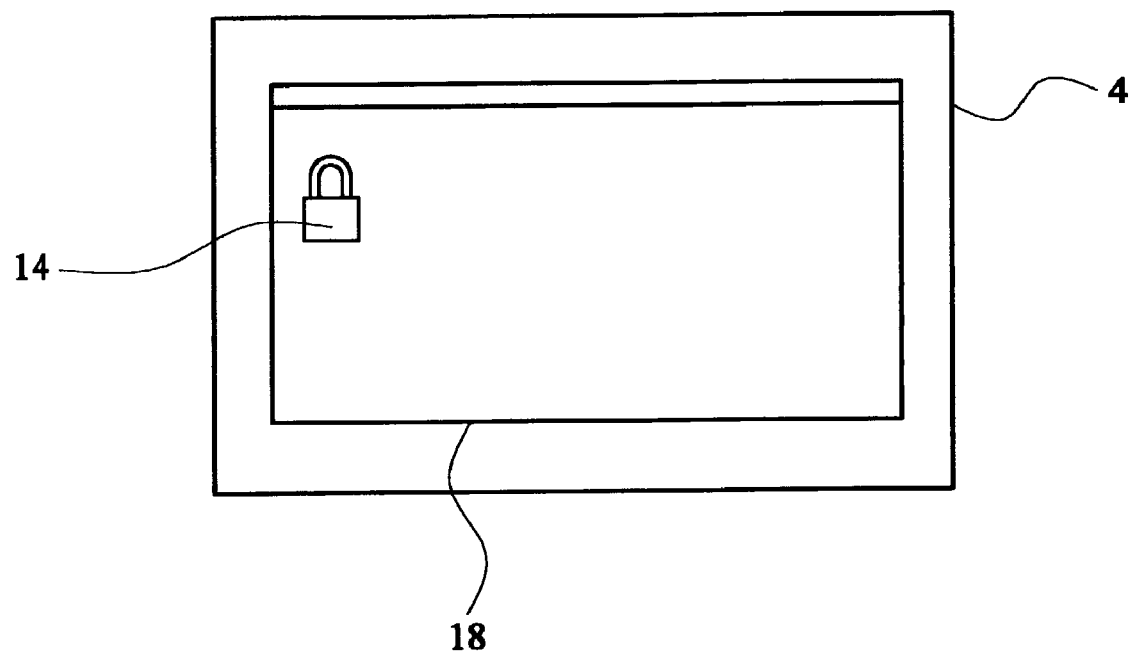
FIG. 5 is a schematic illustration of a web page illustrating another part of the present invention.

To communicate the result of the verification analysis to the user over the E-SIGIL software. A number of alternatives are proposed, typically using a plug-in for the internet browser software:

blank out content of the web site except for verified hallmarks (see FIG. 5 of the drawings that follow and compare with FIG. 3 the other element 20 no longer being visible);

provide the user with a pointer in the shape of a magnifier. The user moves the pointer over a hallmark. If it is authentic, the hallmark will remain, if not it will disappear;

the authentic hallmarks will flash (or adopt some other visual identifier such as changing colour). To prevent the merchant from emulating an authentic hallmark it will flash with a specific colour that changes every minute. The same colour will be displayed in the E-SIGIL tray icon (the random colour is set by, and communicated to the E-SIGIL software by the HVS). If the hallmark is flashing, but does not flash using the displayed colour, the user will know that the hallmark is being faked; or alternatively the use of a colour, as in the preceding paragraph, could be substituted with a recognisable shape. The hallmark would then flash, alternately displayed images of the hallmark and of the HVS defined shape which is also displayed on the E-SIGIL tray icon.

Any hallmarks not so identified will be regarded by the user as invalid.

Thus, the user can obtain hallmark verification by activating an independent application and activating an action independent of the web site in focus.

Figure 6:
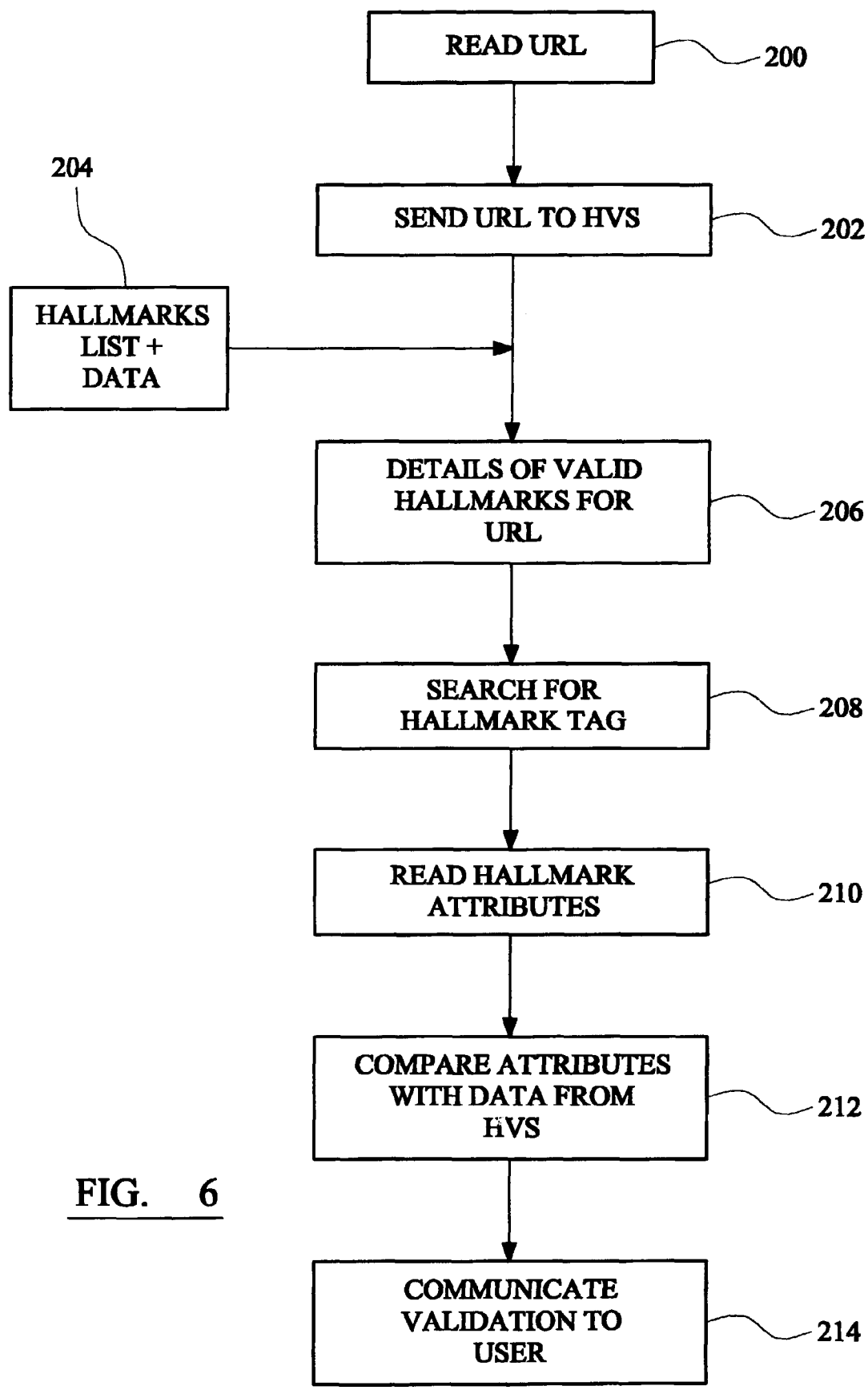
FIG. 6 is a functional flow diagram illustrating a fourth embodiment of the present invention.

A fourth embodiment according to the present invention is described with reference to FIG. 6 of the drawings that follow. Upon being activated by a user clicking on the relevant icon in the system tray, the E-SIGIL software reads (step 208) the URL of the browser in focus (or the last in focus if multiple browser windows are open). The read URL is then sent to the HVS 12 (step 202).

In this fourth embodiment, the HVS 12 stores and maintains a list of valid hallmarks for a specific URL and associated attributes of those hallmarks (item 204).

The HVS 12 returns data to the E-SIGIL application giving details of the hallmarks that are valid for the specific URL identified and the corresponding hallmark attributes (step 206).

The E-SIGIL software next searches the in-focus web site 6 HTML code for a hallmark tag which is a predetermined alphanumeric, in this case ESIGIL followed by the relevant attributes and a closer symbol eg ">" (step 208). When a tag is identified, the attributes of the corresponding hallmark are read (step 210). These attributes will be: logo file name, format, size and dimensions. Optionally, a hash may be taken of the hallmark attributes and information as described above.

The contents of the tag identified hallmark are compared with the data returned from the HVS 12 (step 212). The E-SIGIL software confirms if the hallmark is valid by comparing the HVS provided data with that obtained from the hallmark of the web site in focus. If the data corresponds then the hallmark is validated.

The validation of the hallmark is communicated to the user (step 214) as in the third embodiment of the present invention described above. It is noted that in both these embodiments, the software does not identify fake hallmarks as such, rather it identifies valid hallmarks.

As an alternative, the HVS can store a hash of the data of the hallmark which hash can be compared with a hash of the hallmark of the web site in focus.

The E-SIGIL software identifies the tag of the hallmarks by carrying out a global search of the HTML code of the web site in focus.

Thus, the user can obtain hallmark verification by activating an independent application and activating an action independent of the web site in focus.

Figure 7:
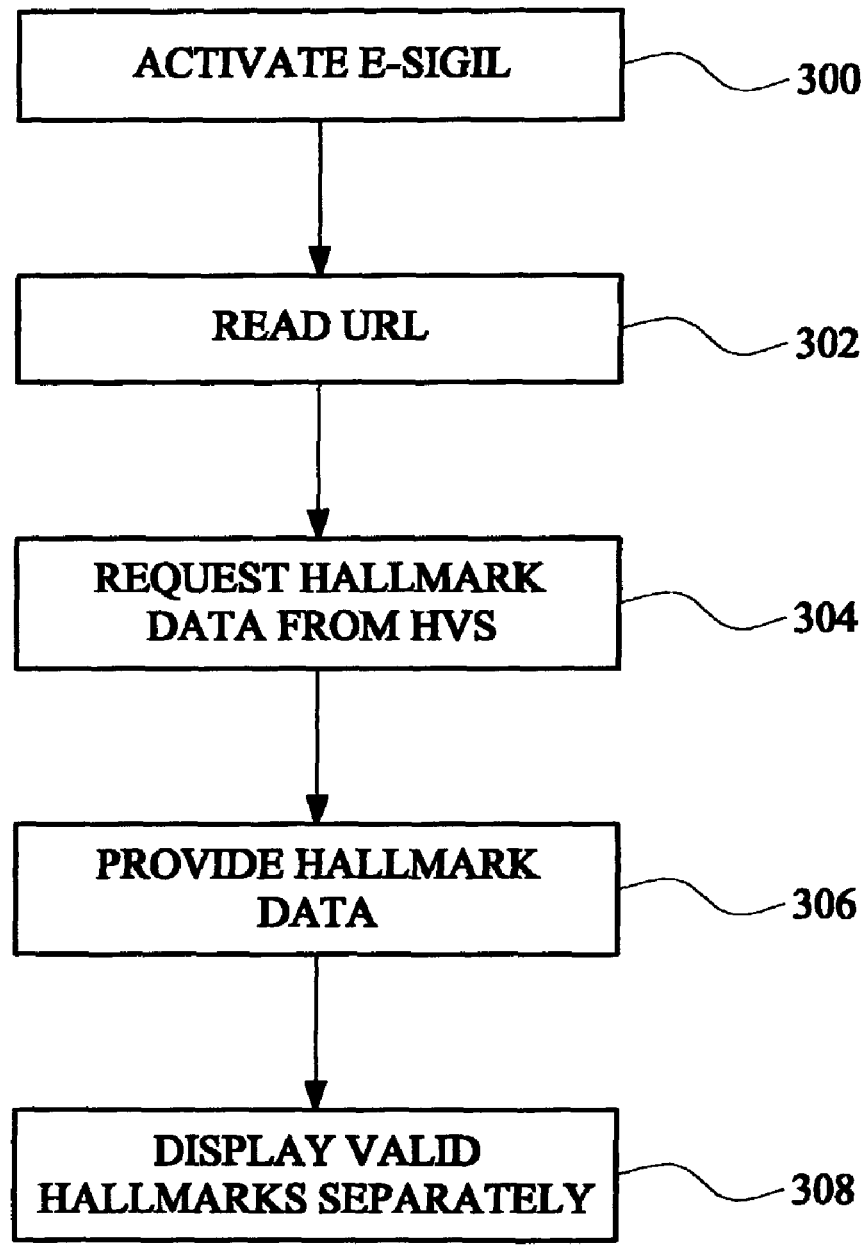
FIG. 7 is a functional flow diagram illustrating a fifth embodiment of the present invention.

A fifth embodiment of the present invention is described with reference to FIG. 7 of the drawings that follow. In this fifth embodiment the HVS stores hallmark data for each hallmark verified. The hallmark data may comprise the actual hallmark image file or a hallmark identification number.

In this embodiment the E-SIGIL software is activated as above (or automatically—the validation process can be executed automatically for each web site as the browser gains focus) (step 300). The E-SIGIL software reads the address (URL) of the web site in focus, or last in focus, (step 302) and submits a request to the HVS 12 for hallmark data regarding all valid hallmarks for this particular site (step 304).

The HVS 12 returns its stored hallmark data for a particular site (step 306).

The user is then provided (step 308) with a separate window, external to the browser, the web site not having control over the separate window, in which the sites' valid hallmarks are displayed. In this case there is no need for the web site even to present a hallmark on the displayed site as the user will know only to trust hallmarks displayed within the separate window.

To display the hallmark images, if the HVS 12 returns an image file to the user then the image can be displayed within the separate window. In the alternative version in which an identification is returned to the E-SIGIL software, this number is used to match to a database of locally stored image files from which the corresponding hallmark is displayed within the separate window. Using this version, network traffic is reduced drastically as the HVS 12 need only inform the E-SIGIL software of which hallmarks to display. Each time the E-SIGIL software contacts the HVS 12, it checks to see if there are any updates of image files to be downloaded (alternatively this can be done by regular e-mails or other methods of communicating the updated image files and corresponding numbers to a database on the local users machine).

Thus, the user can obtain hallmark verification by activating an independent application and activating an action independent of the web site in focus.

Typically the HVS 12 will be available over a local or wide area network or via the internet (each being a distributed electronic network). It is noted, however, that the hallmark data may be on the user's machine, i.e. the HVS is on the user's machine.

Figure 8:
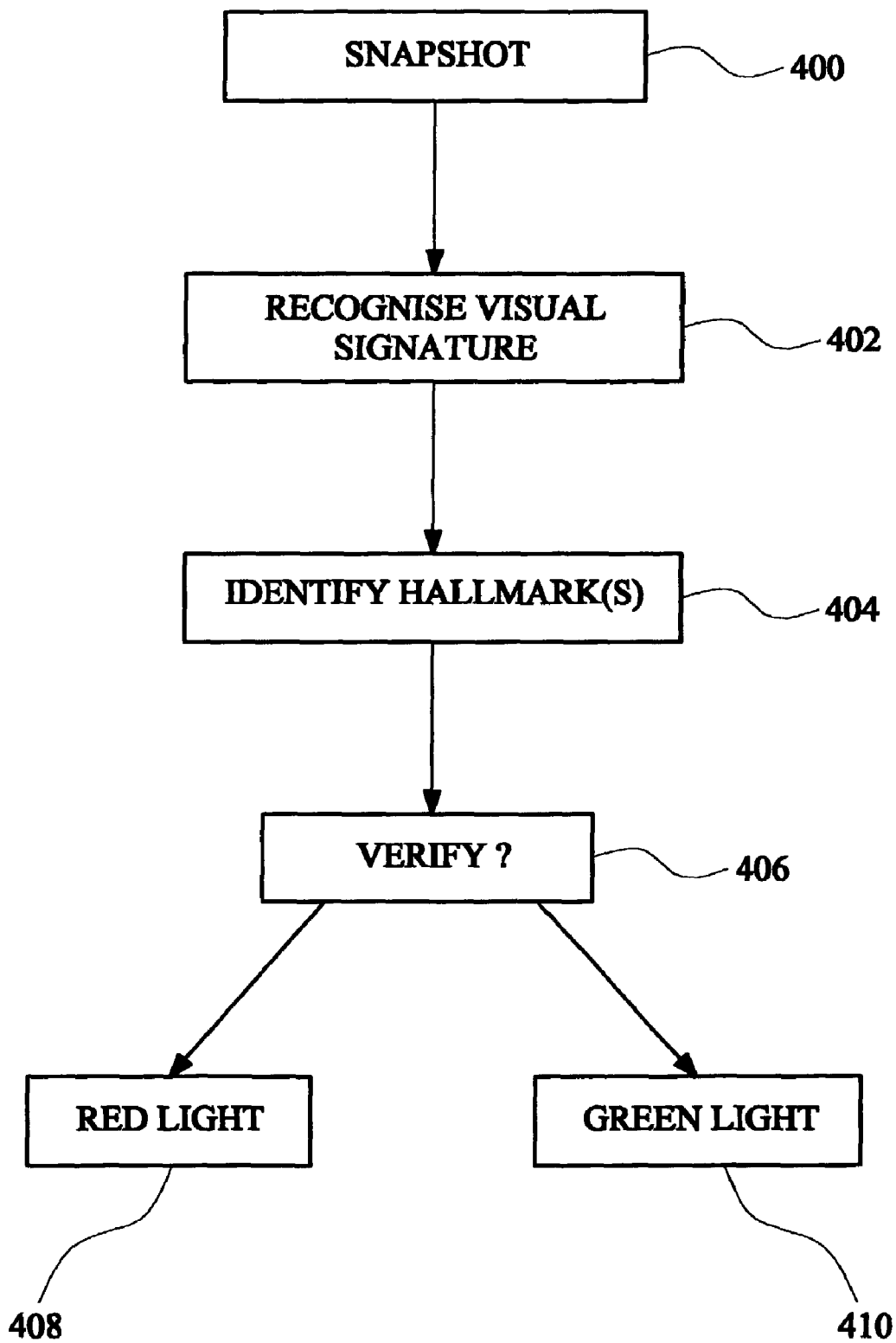
FIG. 8 is a functional flow diagram illustrating a sixth embodiment of the present invention.

A sixth embodiment of the present invention is described with reference to FIG. 8 of the drawings that follow. In this sixth embodiment hallmarks are verified automatically. All hallmarks verifiable by this version of the E-SIGIL software have added to them a characteristic visual signature comprising a graphical border around the hallmark or some sort of other added graphical element which identifies them as E-SIGIL verified. In one version this embodiment the visual signature comprises an image of a padlock. For the reasons set out above, according to the present invention this visual identification is not itself trusted but is verified independently of the web site in focus.

In this case, the HVS takes a more active role because it irregularly but frequently conducts a sweep of all web sites listed as containing verified hallmarks and reads them by taking a snapshot thereof (step 400). Using a neural network back propagation pattern recognition algorithm trained to recognise the visual signature (step 402), the HVS searches for hallmark carrying a visual signature, identifies the corresponding hallmark (step 404) and verifies that the web site is authenticated to display the specific hallmark in question (step 406).

Accordingly, when a user 2 accesses a web site 6, the E-SIGIL software according to this embodiment of the invention sends the URL of the web site in focus (or the last site in focus if multiple browser windows are open) to the HVS 12.

Once the HVS 12 is informed of the URL in focus by the user's terminal 4, it provides details of verified hallmarks 14 for the particular site. The verified hallmark details may be provided by either of the methods set out according to the third to fifth embodiment of the present invention.

If any unauthorised hallmarks have been identified, the HVS 12 instructs the E-SIGIL software to display a warning signal (typically a red light image) (step 408). If the site contains only authorised hallmarks, the HVS instructs the E-SIGIL software to display a verified signal (typically a green light image) (step 410). During the process of verification a "pending" visual signal is provided (typically an amber light image) so the E-SIGIL software can display the status of verification of hallmarks on a web site by using a red, amber and green "traffic light" indication process either in a system tray or in an expandable separate window from the web site.

It is noted that the frequency of the snapshots can and generally will be altered to avoid unauthorised interference. Further, multiple snapshots may be taken to eliminate possible circumvention of the system using animated logos. For example, if a hallmark is drawn using JavaScript trade mark, it may appear on the web site at a rate of 25 different parts every second. This process would allow the true image of the hallmark to be missed out of the snapshot, while at the same time appearing in the full image to the human eye. By employing a multiple snapshot method, the snapshot will reveal exactly what is seen by the user.

Verification of identified hallmarks can be carried out by determining whether the hallmark image file of the web site is a direct match to the image file stored at the HVS. If the file is identical (file name, file size, file dimensions and an optional hash) and the HVS database confirms that this particular URL is authorised to present the particular hallmark, the HVS confirms the authenticity. Alternatively, the additional certificate verification method according to the second embodiment of the present invention can be adopted.

As an alternative version of this embodiment of the invention the user may send a snapshot of the identified (by the visual signature) hallmark to the HVS for verification.

In a further embodiment, the neural network software is on the user's computer. In that case the neural network software takes snapshots (or simply reads the html or XML of the page) looking for a specific image. If such an image is found, the software checks the location and what it is attached to verify that it has a valid certificate. If there is no valid verified certificate, a corresponding warning message is displayed.

The hallmark verification process according to this embodiment of the present invention can therefore be undertaken automatically.

Thus, the user can obtain hallmark verification by activating an application independent of the web site in focus.

Figure 9:
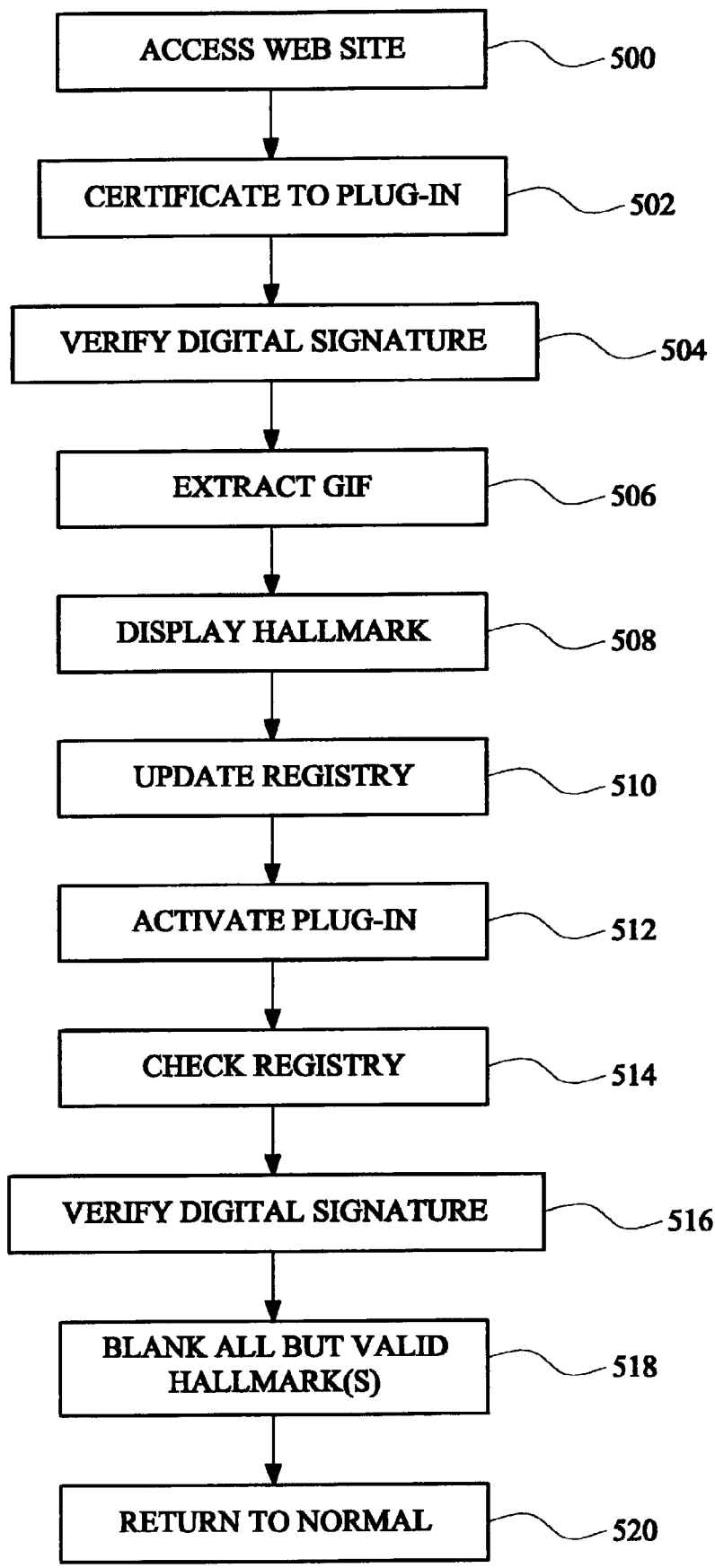
FIG. 9 is a functional flow diagram illustrating a seventh embodiment of the present invention.

A seventh embodiment of the present invention is described with reference to FIG. 9 of the drawings that follow. In this seventh embodiment the digital certificate contains within the digital certificate on the web page code requiring the browser to obtain an object for display which is the certificate.

The following code appears in the web page 6 to identify a certificate of this type, referred to for convenience as an E-SIGIL (trade mark) certificate:

embed
  (identifies to the browser that a third-party plug in is required to read the embedded object).
mime type="x-esigil"
  (specifies the plug-in required to read the object within the <embed> tags.
width="100" height="81"
  (indicate the browser must allocate a window within the browser and specifies the size of the window to be drawn in which to display the data processed by the plug-in—in this case the hallmark 14 (logo).
src="filename.esl"
  (specifies the name and location of the E-SIGIL certificate)

Thus when this code is reached by the browser it uses the E-SIGIL plug-in application which is directed to the location of a digital certificate in X.509 format. The certificate contains a gif file for displaying a digital hallmark 14, including the location thereof, which the plug-in application displays on the window. Whenever the plug-in application reads a certificate is automatically places certificate and window handle (identity of the window to which the certificate belongs) in the Registry. In and of itself, this does not verify the validity of the hallmark because it could have been created and displayed independently by, for instance, a fraudulent web site operator.

Thus, as the web site is accessed (step 500), html code within the web site directs a certificate within the web site to the plug-in application (step 502), which verifies the digital signature of the certificate (step 504), extracts the digital hallmark gif file from the certificate (step 506) and displays the hallmark 14 accordingly (step 508). The registry is updated with certificate and window handle data (step 510).

To verify the hallmark the plug-in application is activated (step 512), usually by clicking on an icon in the system tray. The plug-in application then checks the registry for all certificate and window handle data (step 514). The plug-in application then verifies (step 516) the digital signature of all certificates identified in step 514. After identifying which certificate belongs to which window, from the window handle data, the plug-in application draws a single colour opaque image within either file last used browser or the entire screen except for gaps or holes left at the object location or locations corresponding to the relevant vertical certificate(s) (step 518). Thus the hallmark images extracted from the valid certificates will remain visible, and nothing else, therefore verifying the validity of the relevant hallmark(s) 14. As an alternative, the entire screen can be blanked out and the hallmark(s) 14 re-displayed. After a few seconds, the screen image is returned to normal (step 520).

Thus verification is determined by a separate application outside the control of the browser and web site operator. The present invention can find particular applicability when used to verify the hallmarking of sites for so-called e-commerce. For instance if a site is hallmarked to indicate that it is safe and secure to use for VISA/MASTERCARD (trade marks) financial transactions, the present invention in its several aspects can be used for hallmark verification.

The hallmark(s) to be verified may be on the main page of a site or can be provided by a hyperlink to a hallmark page. In this way the user need not update their site themselves.

Thus, a verified hallmark may be distinctively displayed.

Although the preferred embodiments of the present invention have been described in relation to its implementation on a personal computer platform, other data communication devices can also be utilised.

It is noted that the software application typically used to put this process and system in to practice is activated independently of the web site in focus.

Corrections referred to as being via the internet can be by other communication methods eg buy a local area network ("LAN") or wide area network ("WAN"). Although the present invention finds particular benefit when used in relation to internet connections, the HVS can also be a database and/or application on a user's machine.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

The invention claimed is:

1. A hallmark verification process for verifying a hallmark of a web site in which the web-site comprises a digital certificate that comprises data for displaying the verification indicator, the process comprising the steps of:
   displaying to a computer user a website with a hallmark through a browser,
   running verification software on the computer where such verification software is separate from the website, in which the hallmark verification is initiated by the user clicking on the verification software in said task bar of the computer,
   the verification software verifying multiple hallmarks on the website through the verification software and displaying a verification indicator for each verified hallmark using information from a verification source that is outside of the control of the website operator, in which verifying the hallmark occurs automatically when the verification software detects a mouse being moved by the user over the hallmark,
   determining the location on the website of the verified hallmark and displaying part of the verification indicator at the location of the verified hallmark in a manner that is different from how the verified hallmark is displayed,
   displaying a hallmark from the digital certificate at a location specified in the digital certificate,
   displaying a verification indicator to the user at the location specified in the digital certificate; and
   displaying to the computer user a verification indicator through operation of the verification software where at least part of the verification indicator is in a separate window that is external to user's browser.

2. A hallmark verification process according to claim 1, further comprising periodically sending random data packets from the user's computer through the verification software to a remote hallmark verification source.

3. A hallmark verification process according to claim 1, further comprising:
   verifying the hallmark comprises having the verification software provide data to the verification source about which hallmark of the website should be verified and then having the verification source return to the verification software an index signal that corresponds to the verification indicator displayed outside of the browser drawing area;
   verifying the hallmark further comprises providing the index signal to the website, and the website provider returning to the computer user the verification indicator corresponding to the index signal; and
   verifying the hallmark further comprises the computer user comparing the verification indicator returned by the website provider with the verification indicator provided by the verification source outside of the browser drawing area and confirming that the two are identical.

4. A hallmark verification process according to claim 3 in which comparing the verification indicator part that is returned by the website provider with the verification indicator displayed outside of the browser drawing area provided by the verification source is performed by using pattern recognition on the hallmark of the website.

5. A hallmark verification system for verifying a hallmark of a web site, the system comprising:
   a computer for functioning as a web server,
   a website with a hallmark hosted on the web server,
   a digital certificate associated with the website,
   hallmark verification software that runs on a visitor to the website's local computer where the verification software operates separate from the web server and the website with a hallmark,
   means of connecting a local computer through a network to said web server;
   means of verifying the hallmark outside of the control of the website operator,
   in which a means of activating the hallmark verification including the user clicking on the verification software icon on a task bar of the computer or activating the hallmark verification process is by having the verification software automatically verify each hallmark when a website comes in focus,
   wherein the verification process further comprises determining the location on the website of the verified hallmark and displaying part of the verification indicator at the location of the verified hallmark in a manner that is different from how the verified hallmark is displayed,
   in which the verification software verifies, independent of the website, multiple hallmarks on the website and displays a verification indicator that is, at least in part, displayed outside of the browser viewing area for each verified hallmark in which the hallmark verification process further comprises displaying both the hallmark associated with the digital certificate and the verification indicator at a location specified in the digital certificate; and means of generating and displaying a verification indicator that is displayed by the verification software, at least in part, in a separate window that is external to user's browser.

6. A hallmark verification system according to claim 5, wherein said verification system is configured to periodically send random packet data from the user to a hallmark verification source.

7. A hallmark verification system according to claim 5, in which the system further comprising:

the means of verifying the hallmark comprises having the verification software provide data to the verification source about which hallmark of the website will be verified and then having the verification source return to the verification software an index signal that corresponds to the verification indicator displayed outside of the browser drawing area, the means of verifying the hallmark further comprises providing the index signal to the website and the website returning to the computer user the verification indicator corresponding to the index signal, and the means of verifying the hallmark further comprises the computer user comparing the verification indicator returned by the website with the verification indicator provided by the verification source outside of the browser drawing area and confirming that the two are identical.

8. A hallmark verification system according to claim 7, in which the step of comparing the verification indicator part that is returned by the website provider with the verification indicator displayed outside of the browser drawing area provided by the verification source is performed through pattern recognition of the hallmark of the website.

9. A hallmark verification system according to claim 5, in which the system is configured for the user to request the verification of a hallmark by the user activating the verification software and where the verification software is an executable program external to browser.

10. A hallmark verification system according to claim 5, in which the executable program comprises a hyperlink to the hallmark verification centre.

* * * * *